US011112307B2

(12) United States Patent
Matsushita et al.

(10) Patent No.: US 11,112,307 B2
(45) Date of Patent: Sep. 7, 2021

(54) SPECTROSCOPIC CAMERA

(71) Applicant: Seiko Epson Corporation, Tokyo (JP)

(72) Inventors: Tomonori Matsushita, Chino (JP);
Teruyuki Nishimura, Matsumoto (JP);
Kei Kudo, Shiojiri (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/937,924

(22) Filed: Jul. 24, 2020

(65) Prior Publication Data

US 2021/0025754 A1    Jan. 28, 2021

(30) Foreign Application Priority Data

Jul. 26, 2019   (JP) .............................. JP2019-137617

(51) Int. Cl.
*G01J 3/28*     (2006.01)
*G01J 3/26*     (2006.01)
*G02B 5/28*     (2006.01)

(52) U.S. Cl.
CPC ............... *G01J 3/2823* (2013.01); *G01J 3/26* (2013.01); *G02B 5/28* (2013.01); *G01J 2003/2826* (2013.01)

(58) Field of Classification Search
CPC .......... G01J 3/2823; G01J 3/26; G01J 3/0289; G01J 2003/2826; G01J 5/28
See application file for complete search history.

(56) References Cited

U.S. PATENT DOCUMENTS

2012/0188646 A1* 7/2012 Sano .................. G01J 3/50
                                                    359/578
2014/0268345 A1* 9/2014 Sano .................. G02B 5/28
                                                    359/584

FOREIGN PATENT DOCUMENTS

| JP | 2002-272744 A | 9/2002 |
| JP | 2004-146946 A | 5/2004 |
| JP | 2011-100526 A | 5/2011 |
| JP | 2017-110931 A | 6/2017 |

* cited by examiner

*Primary Examiner* — Dominic J Bologna
(74) *Attorney, Agent, or Firm* — Harness, Dickey & Pierce, P.L.C.

(57) ABSTRACT

A spectroscopic camera includes an interference filter including a pair of reflection films and an imaging device that captures image light passing through the pair of reflection films. The interference filter is provided with a marker that changes the characteristic in accordance with which the image light passes, and the marker is provided in a position where the marker overlaps with the optical path of the image light that passes through the pair of reflection films.

13 Claims, 10 Drawing Sheets

SPECTROSCOPIC CAMERA

The present application is based on, and claims priority from JP Application Serial Number 2019-137617, filed Jul. 26, 2019, the disclosure of which is hereby incorporated by reference herein in its entirety.

BACKGROUND

1. Technical Field

The present disclosure relates to a spectroscopic camera.

2. Related Art

There has been a known spectroscopic camera that separates image light from a target under measurement into light fluxes having a plurality of wavelengths and captures images of the light fluxes with an imaging device (see JPA-2002-272744, for example).

The apparatus described in JP-A-2002-272744 is a spectroscopic camera including a wavelength variable interference filter and an imaging apparatus (imaging device). The spectroscopic camera causes the image light from the target under measurement to be incident on the wavelength variable interference filter and causes the imaging device to capture light separated by the wavelength variable interference filter and having a predetermined wavelength to acquire a spectral image.

In recent years, there is an increasing need for collective acquisition of spectral images captured over a wide imaging range. In this case, the spectroscopic camera described in JP-A-2002-272744 needs to have a larger reflection film of the wavelength variable interference filter, and the reflection film is desirably at least as large as the imaging device.

When the reflection film of the wavelength variable interference filter is as large as the imaging device, however, it is difficult to align the wavelength variable interference filter with the imaging device.

That is, to align the imaging device and the wavelength variable interference filter with each other in the spectroscopic camera, the wavelength variable interference filter is superimposed on the imaging device placed on a mount. In this process, when the reflection film is smaller than the imaging device, the light receiving surface of the imaging device extends off the edge of the reflection film in the view of the wavelength variable interference filter viewed along the direction of the optical axis of the imaging device. The reflection film can therefore be readily positioned with respect to the light receiving surface of the imaging device. When the reflection film is larger than the imaging device, however, the imaging device is hidden behind the reflection film. It is therefore difficult to check the positional relationship between the imaging device and the reflection film. Consequently, the position of the reflection film of the wavelength variable interference filter with respect to the imaging device is shifted from the proper position in some cases. In this case, the spectroscopic camera undesirably cannot acquire a correct spectral image.

SUMMARY

A spectroscopic camera according to a first application example includes an interference filter including a pair of reflection films and an imaging device that captures image light passing through the pair of reflection films. The interference filter is provided with a marker that changes a characteristic in accordance with which the image light passes, and the marker is provided in a position where the marker overlaps with an optical path of the image light that passes through the pair of reflection films.

In the spectroscopic camera according to the application example, the marker provided in the interference filter may be formed of two or more markers located at respective locations.

In the spectroscopic camera according to the application example, the marker provided in the interference filter may be formed of three or more markers located at respective locations.

The spectroscopic camera according to the application example may further include an angle calculator that calculates an angle of inclination of the interference filter with respect to an optical axis of the imaging device based on the position of the marker contained in a captured image captured with the imaging device and a corrector that corrects a wavelength of light received at each pixel of the imaging device based on the angle of inclination.

In the spectroscopic camera according to the application example, the marker may be a recess provided in any of the reflection films.

In the spectroscopic camera according to the application example, the marker may be a light blocker that blocks part of the optical path.

In the spectroscopic camera according to the application example, the interference filter may include electrodes that form an electrostatic actuator that changes a dimension between the pair of reflection films, and the light blocker may be made of the same material as a material of the electrodes.

In the spectroscopic camera according to the application example, the imaging device may have a plurality of pixels, and the marker may be smaller than each of the pixels.

In the spectroscopic camera according to the application example, the imaging device may have an effective pixel area that forms a captured image based on the received light and a recording area provided in an area outside the effective pixel area, and the marker may be provided in a position facing the effective pixel area.

The spectroscopic camera according to the application example may further include an image processor that performs image processing on the captured image, and the image processor may calculate a grayscale value at a marker pixel corresponding to the position of the marker contained in the captured image based on the grayscale values at pixels around the marker pixel.

The spectroscopic camera according to the application example may further include an analysis processor that analyzes a target object based on the captured image, and the analysis processor may exclude a marker pixel corresponding to the position of the marker contained in the captured image from a target under the analysis.

In the spectroscopic camera according to the application example, the imaging device may have an effective pixel area where image data based on the received light is formed and a recording area provided in an area outside the effective pixel area, and the marker may be provided in a position facing the recording area.

The spectroscopic camera according to the application example may further include a movement mechanism that moves a position of the interference filter relative to the imaging device and an adjustment controller that controls the movement mechanism based on the position of the marker with respect to the imaging device to adjust the positions of the interference filter and the imaging device.

DESCRIPTION OF EXEMPLARY EMBODIMENTS

First Embodiment

A first embodiment will be described below.

Figure 1:
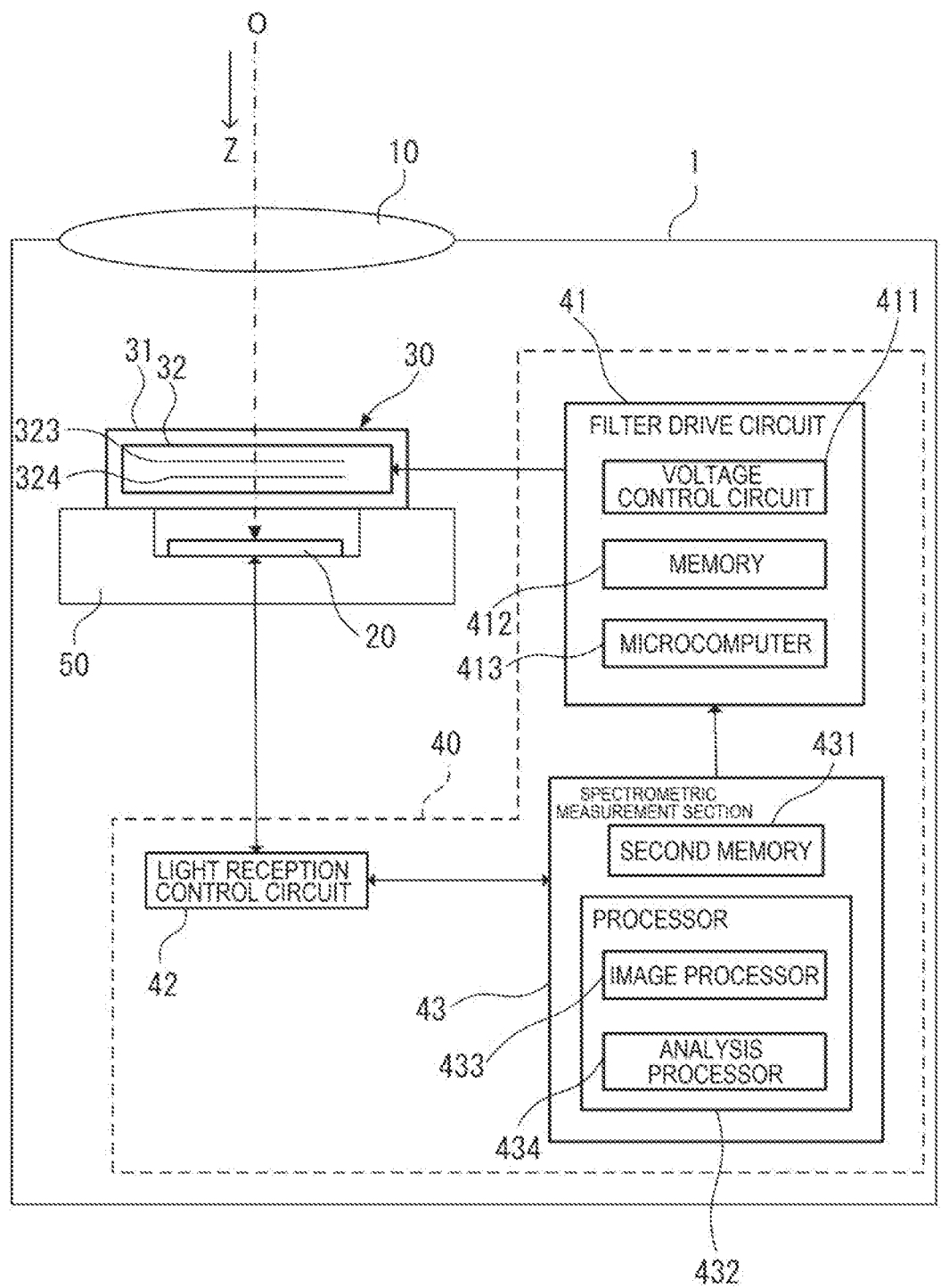
FIG. 1 diagrammatically shows a schematic configuration of a spectroscopic camera according to a first embodiment.

FIG. 1 diagrammatically shows a schematic configuration of a spectroscopic camera 1 according to the first embodiment.

In FIG. 1, the spectroscopic camera 1 includes a light incident optical system 10, an imaging device 20, an optical module 30, and a controller 40. The spectroscopic camera 1 is an apparatus that causes image light from a target object under imaging to be received with the imaging device 20 via the light incident optical system 10 and the optical module 30 to capture a spectral image. It is assumed in the following description that the direction from the optical module 30 toward the imaging device 20 along an optical axis O of the imaging device 20 is referred to as a direction Z.

The light incident optical system 10 is formed of the combination of a plurality of optical members, such as lenses. The light incident optical system 10 guides the image light from the target under imaging to the optical module 30 and brings the image light into focus on the imaging device 20.

The imaging device 20 is an image sensor, for example, a CCD (charge coupled device) and a CMOS (complementary MOS). The imaging device 20 has an effective pixel area 20A (see FIGS. 3 and 4) and a recording area 20B (see FIGS. 3 and 4).

The effective pixel area 20A has a plurality of pixels at the light receiving surface that receives the image light. When the pixels receive the image light, the pixels each output a light reception signal, and a captured image that is image data is formed. In the present embodiment, the imaging device 20 captures light separated by the optical module 30 and having a predetermined wavelength, and the captured image is a spectral image representing the light having the predetermined wavelength.

The recording area 20B is so provided as to externally surround the outer edge of the effective pixel area 20A. The recording area 20B is an area used, for example, in a quality test at the time of manufacture of the imaging device 20 and does not contribute to the generation of the spectral image.

The imaging device 20 is fixed to a mount section 50 provided in the spectroscopic camera 1.

Configuration of Optical Module 30

Figure 2:
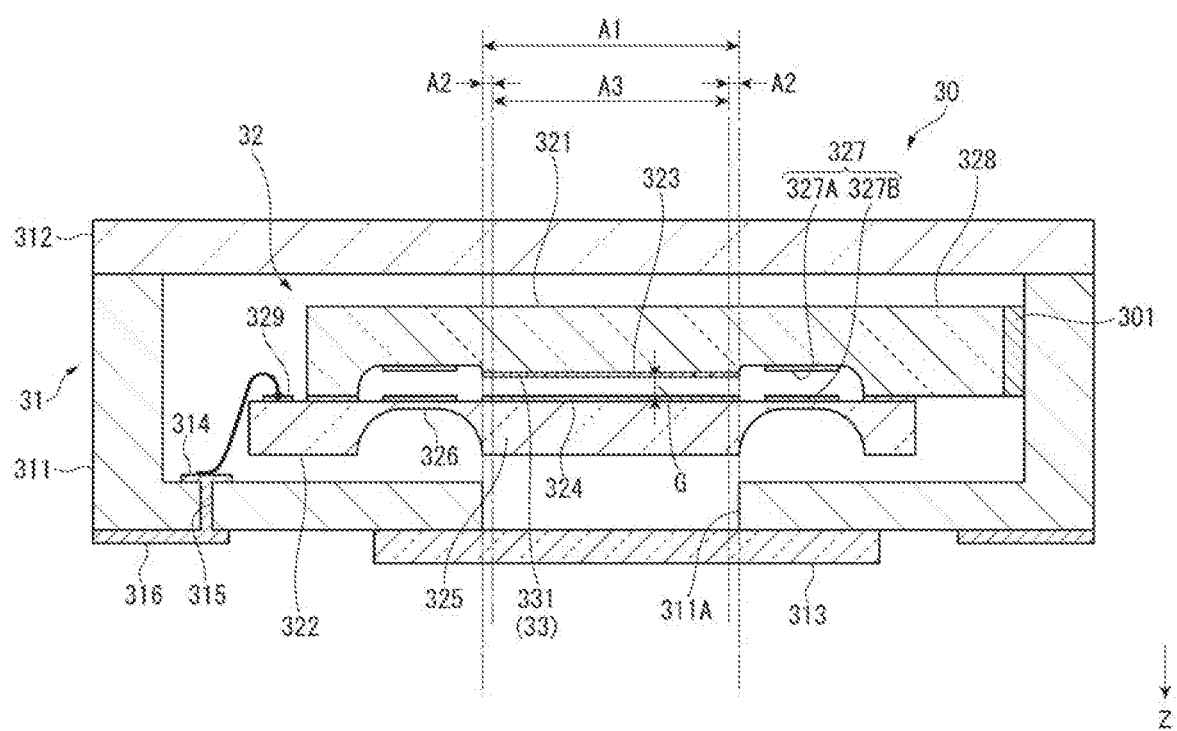
FIG. 2 is a cross-sectional view showing a schematic configuration of an optical module of the first embodiment.

FIG. 2 is a cross-sectional view showing a schematic configuration of the optical module.

The optical module 30 is, for example, fixed to the mount section 50, on which the imaging device 20 is placed.

The optical module 30 includes a package enclosure 31 and an interference filter 32 accommodated in the package enclosure 31, as shown in FIG. 2.

The package enclosure 31 includes a base 311 and a lid 312, as shown in FIG. 2. The base 311 and the lid 312 bonded to each other form an internal accommodation space that accommodates the interference filter 32.

Configuration of Interference Filter 32

The interference filter 32 is a wavelength variable Fabry-Perot element. Specifically, the interference filter 32 includes a first substrate 321 and a second substrate 322, which faces the first substrate 321. A first reflection film 323 is provided on a surface of the first substrate 321 that is the surface facing the second substrate 322, and a second reflection film 324, which faces the first reflection film 323, is provided on a surface of the second substrate 322 that is the surface facing the first substrate 321. That is, the first reflection film 323 and the second reflection film 324 are so disposed as to face each other via a gap G. The first reflection film 323 and the second reflection film 324 are each not necessarily made of a specific material and may each be formed, for example, of a metal film, a metal alloy film, or a dielectric multilayer film.

The second substrate 322 is provided with a movable section 325, on which the second reflection film 324 is provided, and a diaphragm 326, which is so provided as to surround the outer circumference of the movable section 325 and has a thickness along the direction Z smaller than that of the movable section 325.

Further, a first electrode 327A is provided on a surface of the first substrate 321 that is the surface facing the second substrate 322, and the second substrate 322 is provided with a second electrode 327B, which faces the first electrode 327A. The first electrode 327A and the second electrode 327B form an electrostatic actuator 327. Applying voltage to the gap between the first electrode 327A and the second electrode 327B bends the diaphragm 326, so that the movable section 325 is displaced toward the first substrate 321. The dimension of the gap G thus changes, and light having a wavelength according to the dimension of the gap G passes through and exits out of the interference filter 32.

The interference filter 32 may include capacitance detection electrodes that detect the dimension of the gap G.

One end of the first substrate 321 of the interference filter 32 forms a filter fixed end 328, which protrudes outward beyond one end of the second substrate 322. The filter fixed end 328 is fixed to the package enclosure 31 via a fixing member 301.

Terminal sections 329, which correspond to the first electrode 327A and the second electrode 327B, are provided at part of the second substrate 322. The terminal sections 329 are coupled to internal terminals 314 provided in the package enclosure 31.

Figure 3:
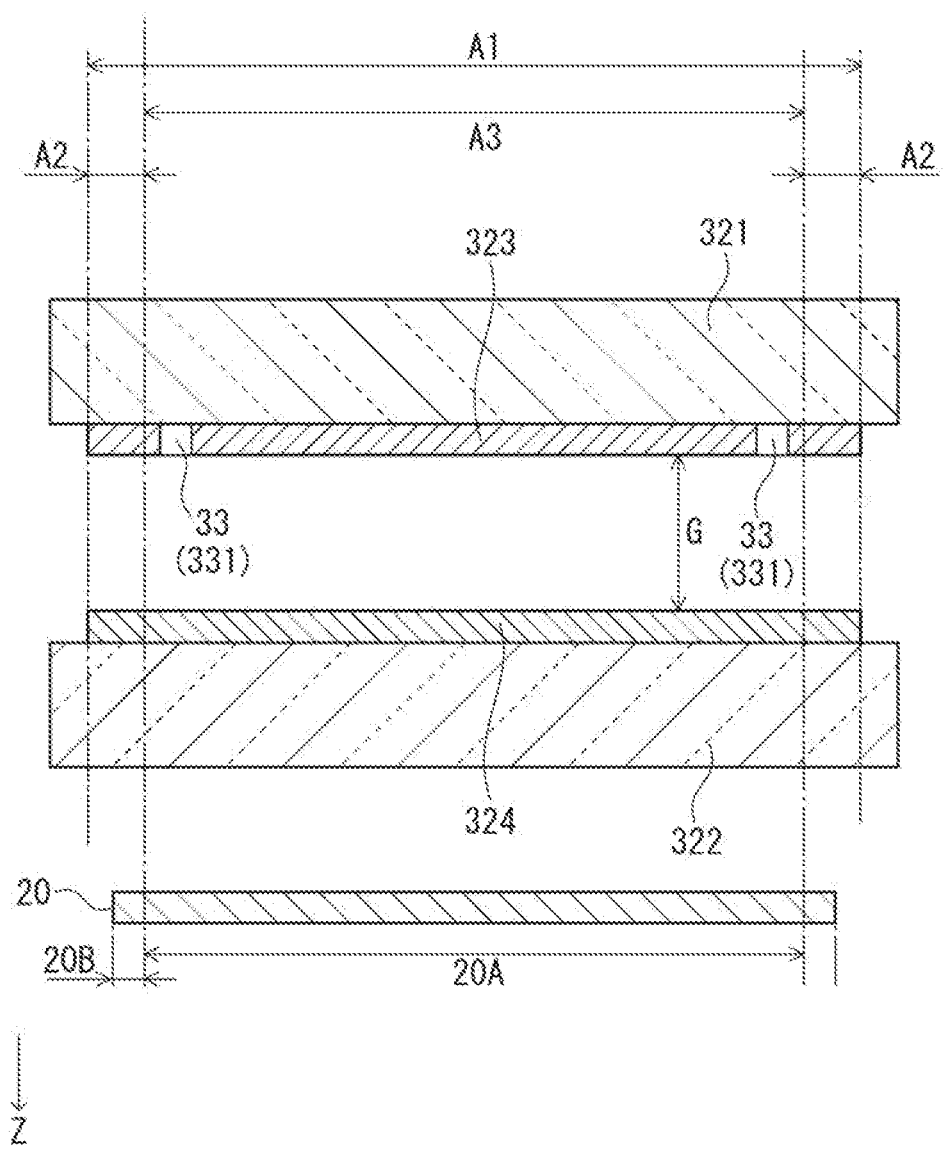
FIG. 3 describes the positional relationship of first and second reflection films with an imaging device in the first embodiment.
Figure 4:
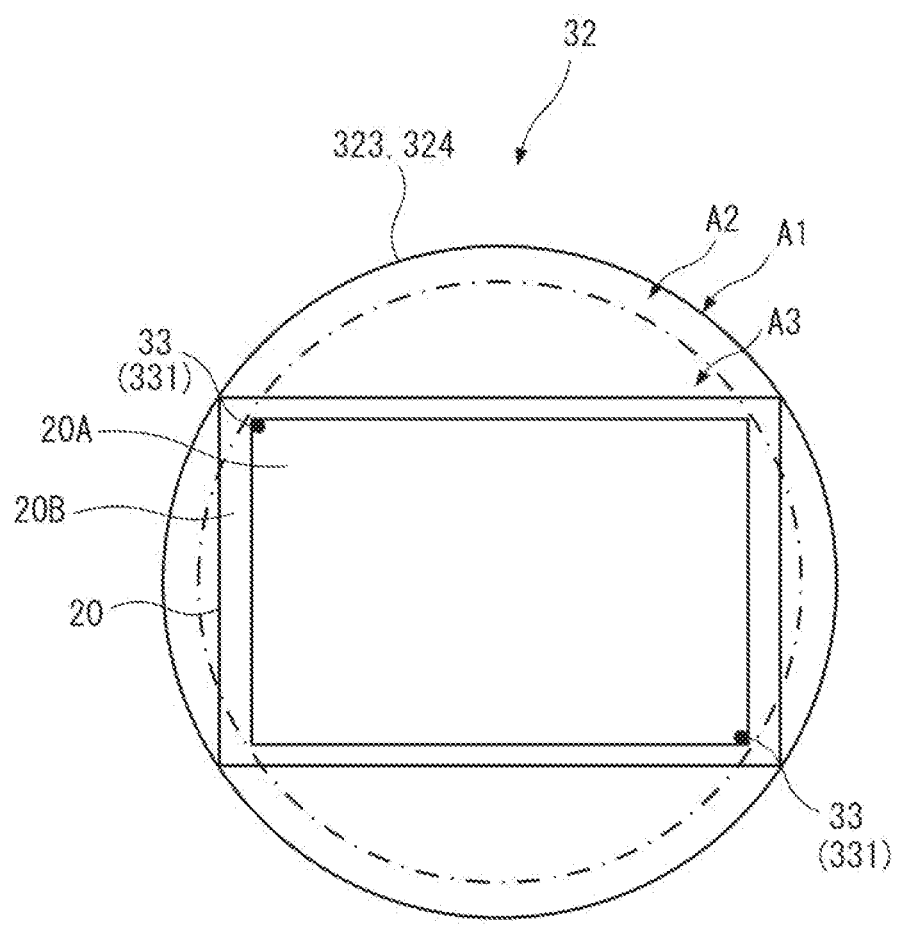
FIG. 4 shows the positional relationship between a mirror facing area and the imaging device in the plan view in which an interference filter of the first embodiment is viewed along a direction Z.

FIG. 3 describes the positional relationship of the first reflection film 323 and the second reflection film 324 with the imaging device 20 in the present embodiment. FIG. 4 shows the positional relationship between the imaging device 20 and a mirror facing area A1, where the first reflection film 323 and the second reflection film 324 overlap with each other in the plan view viewed in the direction Z.

In the interference filter 32 in the present embodiment, out of the image light incident via the light incident optical system 10 along the direction Z, the light having entered the mirror facing area A1, where the first reflection film 323 and the second reflection film 324 face each other, undergoes multiple interference, and light having a predetermined wavelength according to the dimension of the gap G passes through the interference filter 32. Light reflected off, for example, the diaphragm 326 is likely to enter as stray light the area in the vicinity of the outer circumference edge of the mirror facing area A1, resulting in degradation in the spectral characteristic at area in the vicinity of the outer circumference edge of the mirror facing area A1 as compared with a central area thereof. The area inward by a predetermined margin from the outer circumference edge of the mirror facing area A1 (outer circumferential area A2) is therefore preferably excluded from the imaging area of the imaging device 20. In the present embodiment, an effective area A3 is the area inside the outer circumferential area A2.

In the present embodiment, the mirror facing area A1 of the interference filter 32 is larger than the effective pixel area 20A of the imaging device 20 in the plan view viewed in the direction Z, as shown in FIG. 4. More specifically, the position of the interference filter 32 relative to the imaging device 20 is so adjusted that the effective pixel area 20A falls within the effective area A3.

When the optical module 30 including the interference filter 32 is so provided with respect to the imaging device 20 provided on the mount section 50 as to cover the imaging device 20, the imaging device 20 is hidden behind the first reflection film 323 and the second reflection film 324. It is therefore very difficult to position the interference filter 32 with respect to the imaging device 20.

To avoid the problem described above, the interference filter 32 is in the present embodiment provided with markers 33, which are located in the mirror facing area A1, through which the image light from a target under spectroscopic measurement passes, and the markers 33 are used to identify the positions of the first reflection film 323 and the second reflection film 324.

More specifically, in the present embodiment, the markers 33 are disposed in positions on the first reflection film 323 that are positions in the effective area A3 but close to the outer circumferential area A2 and are further so disposed as to face the effective pixel area 20A when the interference filter 32 is disposed in a proper position with respect to the imaging device 20, as shown in FIG. 3.

The markers 33 are recesses 331, which are so provided as to pass through the first reflection film 323, and the first substrate 321 is exposed in the positions where the recesses 331 are provided.

In the present embodiment, the first reflection film 323 is provided with two recesses 331, as shown in FIG. 4. The recesses 331 is preferably smaller in the plane XY perpendicular to the direction Z than each of the pixels of the imaging device 20.

In the configuration described above, the optical characteristics only in the positions corresponding to the recesses 331 differ from those in the other positions in the effective area A3. In the present embodiment, only the light having the predetermined wavelength according to the dimension of the gap G passes through the interference filter 32 in the positions where no recess 331 is provided, whereas light having the other wavelengths also passes through the interference filter 32 in the positions of the recesses 331.

In the configuration described above, when the optical module 30 that accommodates the interference filter 32 is fixed to the mount section 50 to which the imaging device 20 has been fixed, the imaging device 20 and the interference filter 32 are aligned with each other as described below.

First, light having a first wavelength is caused to enter the interference filter 32 along the direction Z, and the gap G in the interference filter 32 is set at a dimension corresponding to a second wavelength different from the first wavelength. The dimension corresponding to the second wavelength can, for example, be an initial gap dimension achieved when no voltage is applied to the electrostatic actuator 327. In this case, control of the voltage applied to the electrostatic actuator 327 of the interference filter 32 can be omitted.

In this state, an image captured with the imaging device 20 is a spectral image representing the captured light having the second wavelength and having passed through the interference filter 32. In a portion of the interference filter 32 that is the portion excluding the recesses 331, the gap G has a dimension that allows the light having the second wavelength to pass through the interference filter 32 but does not allow the light having the first wavelength to pass therethrough. The light having the first wavelength therefore passes through the interference filter 32 only in the positions of the recesses 331, and the resultant spectral image has large grayscale values at marker pixels that are pixels corresponding to recesses 331 and small grayscale values at the other pixels. A person who assemble the spectroscopic camera 1 therefore adjusts the position of the optical module 30 including the interference filter 32 based on the spectral image captured with the imaging device 20 while detecting the marker pixels in such a way that the marker pixels are located in positions set in advance.

For example, in FIG. 4, the two recesses 331 are so provided as to be located at the vertices on a diagonal of the effective pixel area 20A, which has a rectangular shape, when the interference filter 32 is positioned in a proper position with respect to the imaging device 20. In this case, the position of the optical module 30 with respect to the imaging device 20 is so adjusted that the recesses 331 detected based on the light reception signals outputted from the imaging device 20 coincide with the corners on a diagonal of the rectangle corresponding to the image data. Misalignment between the imaging device 20 and the interference filter 32 is thus suppressed, whereby light having passed through the effective area A3 and therefore having high wavelength resolution can be received by the effective pixel area 20A of the imaging device 20.

Configuration of Package Enclosure 31

The package enclosure 31 is formed of the base 311 and the lid 312, as described above.

The base 311 has a substantially container-like shape, as shown, for example, in FIG. 2. The base 311 has an opening 311A, which passes through the package enclosure 31 along the optical axis O of the imaging device 20, and a light transmissive plate 313 is so bonded as to close the opening 311A. The opening 311A has the same size as that of the mirror facing area A1 and preferably coincides with the mirror facing area A1 when viewed along the direction Z. That is, if the opening 311A is larger than the mirror facing area A1, stray light and outside light that come from the space outside the mirror facing area A1 and externally enter the spectroscopic camera 1 and are reflected off walls and other parts in the spectroscopic camera 1 and the optical module 30 could undesirably enter the imaging device 20. When the opening 311A has the same size as that of the mirror facing area A1, the stray light and outside light described above can be suppressed, whereby a high-precision spectral image can be captured.

The internal terminals 314, which are coupled to the terminals 329 of the interference filter 32, are provided on an inner surface of the base 311 that is the inner surface facing the lid 312. Further, the base 311 is provided with pass-through sections 315, which are formed in the positions where the inner terminals 314 are provided and pass through the package enclosure 31 from the inner side to the outer side thereof, and the inner terminals 314 are coupled via the pass-through sections 315 to outer terminals 316 provided on a surface of the base 311 that is the surface opposite the lid 312. The first electrode 327A and the second electrode 327B of the interference filter 32 are coupled to the controller 40 via the terminal sections 329, the inner terminals 314, and the outer terminals 316.

The lid 312 is formed of a light transmissive substrate and so coupled to the base 311 as to close the container opening end of the base 311.

The pressure in the inner space of the package enclosure 31 that is the space encapsulated by the base 311, the lid 312, and the light transmissive plate 313 is preferably reduced to a value lower than the atmospheric pressure, allowing improvement in the sensitivity to a change in the gap G.

In the present embodiment, fixing the package enclosure 31 that accommodates the interference filter 32 to the mount section 50 places the optical module 30 on the mount section 50. In this process, the light having the first wavelength is caused to enter the optical module 30, and the dimension of the gap G is set a value corresponds to the second wavelength different from the first wavelength, as described above. The optical module 30 is then so positioned by referring to a spectral image captured with the imaging device 20 to detect the marker pixels corresponding to the recesses 331 that the marker pixels are located in predetermined position in the captured image.

Configuration of Controller 40

The controller 40 includes a filter drive circuit 41, a light reception control circuit 42, a spectrometric measurement section 43, and other components, as shown in FIG. 1. The controller 40 may include one or more processors as described below.

The filter drive circuit 41 is a circuit that controls the operation of driving the interference filter 32. The filter drive circuit 41 may be provided as part of the mount section 50, to which the optical module 30 is fixed, or may be so provided as to be separate from the mount section 50.

The filter drive circuit 41 includes a voltage control circuit 411, a memory 412, and a microcomputer 413.

The voltage control circuit 411 is a circuit that applies drive voltage to the electrostatic actuator 327 under the control of the microcomputer 413. More specifically, in the present embodiment, when the microcomputer 413 issues an instruction of application of target voltage corresponding to a target wavelength, the voltage control circuit 411 drives the electrostatic actuator 327 based on the target voltage.

The memory 412 records a drive table in which target wavelengths of the light that passes through the interference filter 32 and target values of the gap G that correspond to the target wavelengths are recorded.

The microcomputer 413 sets a target wavelength upon reception of an instruction to capture a spectral image from the spectrometric measurement section 43 and controls the voltage control circuit 411 to cause it to perform spectrometric measurement. Examples of the image capture instruction from the spectrometric measurement section 43 include an instruction to capture spectral images at wavelengths at predetermined wavelength intervals over a predetermined wavelength region and an instruction to capture a spectral image at a single target wavelength.

The light reception control circuit 42 includes, for example, an amplification circuit that amplifies the light reception signals corresponding to the pixels and outputted from the imaging device 20, an A/D conversion circuit that converts the light reception signals into digital signals, and an image generation circuit that generates image data based on the light receptions signals corresponding to the pixels and outputted from the A/D conversion circuit. The light reception control circuit 42 causes the circuits described above to process the light reception signals to calculate grayscale values at the pixels and generates a spectral image in the form of image data.

The spectrometric measurement section 43 outputs the image capture instruction to the filter drive circuit 41 and the light reception control circuit 42 based, for example, on a user's operation. The spectrometric measurement section 43 then carries out a variety of processes based on the image data on the spectral image inputted from the light reception control circuit 42.

Specifically, the spectrometric measurement section 43 includes a second memory 431 and a processor 432. The processor 432 reads and executes a software program recorded in the second memory 431 to carry out the variety of processes. For example, the spectroscopic camera 1 according to the present embodiment captures a spectral image of a target under imaging and displays the captured spectral image on a display that is not shown, or analyzes components that form the target under imaging based on spectral images at a plurality of wavelengths. In this case, the processor 432 functions as an image processor 433, an analysis processor 434, and other functional portions, as shown in FIG. 1.

The image processor 433 performs predetermined image processing on an image captured with the imaging device 20, that is, the spectral image inputted from the light reception control circuit 42 and displays the processed image on the display that is not shown.

In this process, the image processor 433 identifies the marker pixels in the image data on the spectral image inputted from the light reception control circuit 42. The marker pixels are detected when the optical module 30 is positioned with respect to the imaging device 20 and are recorded in the second memory 431. The image processor 433 then calculates the grayscale value at each of the marker pixels based on the grayscale values at the pixels around the marker pixel. For example, the image processor 433 calculates the average of the grayscale values at the eight pixels around each of the marker pixels to provide the grayscale value at the marker pixel.

The analysis processor 434 analyzes components that form the target under imaging based on the spectral images at the plurality of wavelengths. For example, the analysis processor 434 calculates an optical spectrum at each of the pixels, detects a spectral characteristic, such as an absorption spectrum, specific to each component based on the shape of the optical spectrum to analyze the components that form the target under imaging, and displays, for example, the result of the analysis on the display that is not shown. In this process, the analysis processor 434 excludes the marker pixels from the target under analysis and performs the component analysis based on the optical spectra at the pixels other than the marker pixels.

Effects Provided by Action in Present Embodiment

The spectroscopic camera 1 according to the present embodiment includes the optical module 30 and the imaging device 20, which receives light having passed through the optical module 30. The optical module 30 includes the interference filter 32 including the first reflection film 323 and the second reflection film 324, which face each other via the gap G. The interference filter 32 has the markers 33, which are provided in the positions that overlap with the mirror facing area A1 corresponding to the optical path of the image light passing through the first reflection film 323 and the second reflection film 324 and which change the characteristics in accordance with which the interference filter 3 transmits the image light.

The thus configured spectroscopic camera 1 can detect the marker pixels of the imaging device 20 by causing the image light to enter the spectroscopic camera 1 and allows precise alignment between the imaging device 20 and the interference filter 32 based on the positions of the marker pixels. The imaging device 20 can therefore appropriately receive the light having passed through the effective area A3, whereby a high-precision spectral image can be captured.

In the spectroscopic camera 1 according to the present embodiment, the markers 33 in the interference filter 32 are provided at two locations.

In a case where the number of markers 33 is one, and when the interference filter 32 is rotated around an axis passing through the marker 33 and parallel to the direction Z, misalignment of the interference filter 32 with the imaging device 20 cannot be detected in some cases. In contrast, the markers 33 provided at least at two locations allow detection of misalignment of the interference filter 32 due to rotation of the interference filter 32 around an axis parallel to the direction Z. The interference filter can therefore be precisely aligned with the imaging device 20.

In the present embodiment, the markers 33 are the recesses 331 provided in the first reflection film 323.

The thus provided recesses 331 can be readily formed when the first reflection film 323 is deposited and patterned.

That is, when a reflection film, such as the first reflection film 323, is formed on a substrate, a film material that eventually forms the first reflection film 323 is deposited on the substrate, and the film material is then patterned into the shape of the first reflection film 323 in an etching process. Instead, the first reflection film 323 may be formed in a liftoff process. In this case, after a resist pattern may be formed in the region excluding the first reflection film 323, a film material that eventually forms the first reflection film 323 may be deposited, and the unnecessary portion may be removed along with the resist to form the first reflection film 323. In the former case, the recesses 331 may be formed concurrently with the patterning of the first reflection film 323 in the etching process. In the latter case, the resist may be formed also in the positions where the recesses 331 are formed. The recesses 331 can thus be formed concurrently with the process of removing the resist to pattern the first reflection film 323.

In the present embodiment, the markers 33 are so provided in the interference filter 32 that the markers 33 face the effective pixel area 20A of the imaging device 20 when the interference filter 32 is disposed in a proper position with respect to the imaging device 20.

The positions of the markers can therefore be identified based on a spectral image captured with the imaging device 20 when the interference filter 32 is positioned with respect to the imaging device 20.

In the present embodiment, the recesses 331 are so formed as to pass through the first reflection film 323 and expose the first substrate 321. Therefore, in the present embodiment, only the light having a wavelength according to the gap G passes through an area of the mirror facing area A1 that is the area excluding the recesses 331, and no interference occurs in the positions of the recesses 331, which are each a through hole, so that light having wavelengths other than the wavelength according to the gap G also passes through the interference filter 32 at the transmittance according to the transmission characteristic of the second reflection film 324. Therefore, when the interference filter 32 is positioned with respect to the imaging device 20, and the optical module 30 is fixed to the mount section 50, the dimension of the gap G is so set at a predetermined value that the light having the first wavelength can pass through the optical module 30, and the light having the second wavelength different from the first wavelength is caused to enter the optical module 30. As a result, the marker pixels facing the recesses 331 can be readily detected in a spectral image outputted from the imaging device 20, and adjusting the position of the interference filter 32 with respect to the imaging device 20 in such a way that the marker pixels are located in the predetermined positions in the spectral image allows the interference filter 32 to be readily and precisely positioned with respect to the imaging device 20.

In the present embodiment, the planar size of each of the recesses 331, which are markers 33, in the plane XY is smaller than that of one pixel of the imaging device 20.

The effect of the provided recesses 331 on a spectral image captured with the imaging device 20 can therefore be minimized. That is, since the pixels facing the recesses 331 also receive light having passed through the interference filter 32 and having wavelengths other than the target wavelength, the pixels cannot each output a light reception signal based on the accurate amount of light having the target wavelength. In the present embodiment, in which the recesses 331 are each smaller than one pixel, the number of pixels that do not allow accurate spectrometric measurement can be reduced, whereby a decrease in precision of a spectral image can be suppressed.

The spectroscopic camera 1 according to the present embodiment includes the image processor 433, which processes a spectral image captured with the imaging device 20. The image processor 433 calculates the grayscale value at each of the marker pixels corresponding to the recesses 331 contained in the captured spectral image based on the grayscale values at the pixels around the marker pixel.

Since the accurate amount of light having the target wavelength cannot be measured at the marker pixels, as described above, generation of a spectral image based on the light reception signals outputted from the marker pixels causes presence of pixels having grayscale values calculated based on the light having wavelengths different from the target wavelength, resulting in a decrease in precision of the spectral image. In contrast, in the present embodiment, the image processor 433 calculates the grayscales at each of the marker pixels based on the grayscale values at the pixels around the marker pixel but does not use the grayscale values based on the light reception signals from the marker pixels. A decrease in precision of the spectral image can thus be suppressed.

The spectroscopic camera 1 according to the present embodiment includes the analysis processor 434, which analyzes components that form a target under imaging, and the analysis processor 434 excludes the marker pixels from the target under analysis.

Since accurate spectroscopic measurement cannot be performed at the marker pixels, as described above, the optical spectrum at each of the marker pixels is inaccurate and therefore does not allow proper component analysis. In the present embodiment, excluding the marker pixels from the target under analysis allows suppression of a decrease in precision of the component analysis.

Second Embodiment

A second embodiment will next be described.

In the first embodiment described above, the case where the markers 33 are provided at two locations has been presented. The second embodiment differs from the first embodiment described above in that the markers 33 are provided at three locations.

Figure 5:
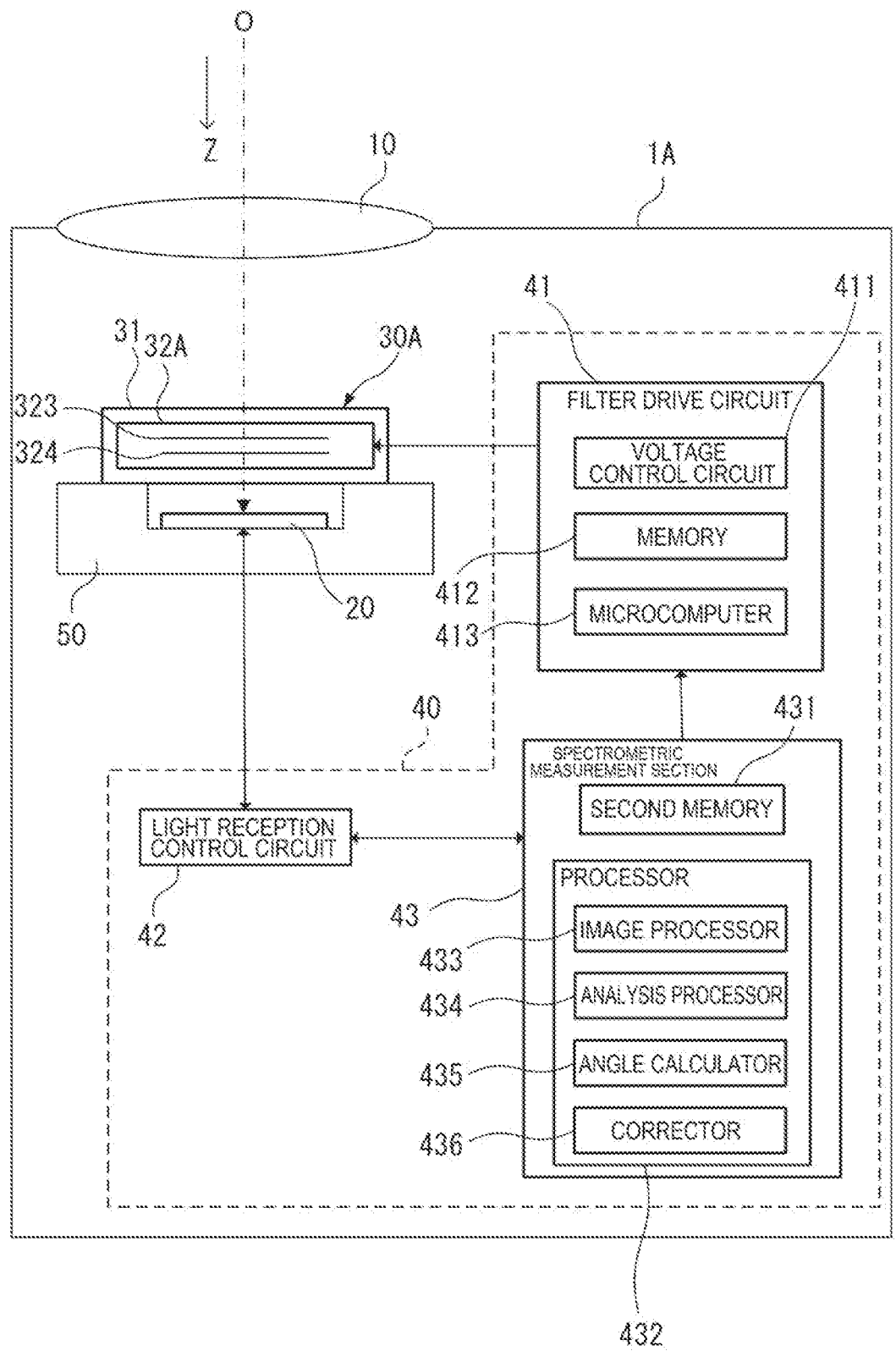
FIG. 5 shows a schematic configuration of a spectroscopic camera according to a second embodiment.
Figure 6:
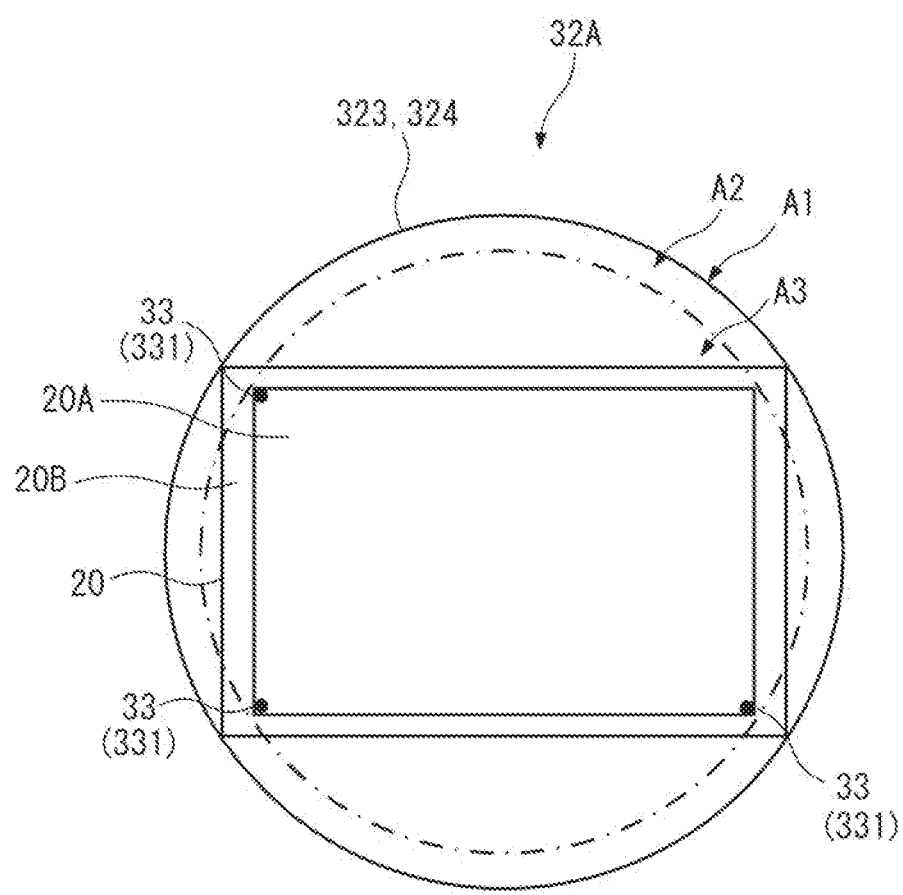
FIG. 6 shows the positional relationship between the positions of markers in a mirror facing area and the imaging device in the second embodiment.

FIG. 5 shows a schematic configuration of a spectroscopic camera 1A according to the present embodiment. FIG. 6 shows the positional relationship between the positions of the markers 33 in the mirror facing area A1 and the imaging device 20.

In the following description, the same configurations as those in the first embodiment have the same reference characters, and the description of the same configurations will be omitted or simplified.

The spectroscopic camera 1A according to the second embodiment includes the light incident optical system 10, the imaging device 20, an optical module 30A, and the controller 40, substantially as in the first embodiment. The optical module 30A further includes the package enclosure 31 and an interference filter 32A.

The interference filter 32A has substantially the same configuration as that in the first embodiment, but the positions where the recesses 331, which are the markers 33, are provided differ from those in the first embodiment. Specifically, the first reflection film 323 is provided with three recesses 331, which are not arranged along a single straight line in the plane XY. For example, the recesses 331 are provided at three vertices of the imaging device 20 having the rectangular effective pixel area 20A, as shown in FIG. 6.

In the present embodiment, the processor 432 of the spectral measurement section 43 also functions as an angle calculator 435 and a corrector 436, as shown in FIG. 5.

The angle calculator 435 detects the positions of the marker pixels in a spectral image captured with the imaging device 20.

In the present embodiment, the interference filter 32A is provided with three recesses 331. Comparison between the positions of the recesses 331 of the interference filter 32A and the marker pixels in a spectral image captured with the imaging device 20 allows detection of the angle of inclination of the interference filter 32A with respect to the optical axis O. The positions of the three recesses 331 provided in the interference filter 32A are known and recorded in advance in the second memory 431.

The angle calculator 435 calculates the distances between the marker pixels in a spectral image based on the three marker pixels detected in the spectral image. In the present embodiment, the distances between the recesses 331 of the interference filter 32A are measured in advance at the time of manufacture of the interference filter 32A and recorded in the second memory 431. The angle calculator 435 then calculates the angle of inclination of the first reflection film 323 of the interference filter 32A with respect to the optical axis O based on the distances between the marker pixels and the distance between the recesses 331 of the interference filter 32A.

Also in the first embodiment, the angle of inclination of the interference filter 32 can be calculated based on the positions of the marker pixels and the recesses 331, but the calculation provides the angle of inclination with respect to the straight line that connects the recesses 331 to each other. In contrast, in the second embodiment, the positions of the three recesses 331 and the three marker pixels corresponding thereto allow determination of the plane along which the interference filter 32A inclines and more precise calculation of the angle of inclination than in the first embodiment.

The corrector 436 corrects the wavelength at which a spectral image is captured and corrects the dimension of the gap G for capturing a spectral image at a target wavelength based on the calculated angle of inclination of the interference filter 32A.

The following description will be made of a case where the interference filter 32A does not incline with respect to the optical axis O and the dimension of the gap G is set at $g_0$ that allows transmission of light having a target wavelength $\lambda_0$. In this case, when the interference filter 32A inclines by $\theta$, light passes through the interference filter 32A under the condition expressed by Expression (1) below.

$$m\lambda = 2ng_0 \cos\theta \quad (1)$$

In Expression (1), m represents the degree, and n represents the refractive index of the medium (air) between the first reflection film 323 and the second reflection film 324. For simplification, the description will be made of a case where m=1 is satisfied. Expression (1) shows that the wavelength of the light that passes through the interference filter 32A changes even when the gap dimension $g_0$ remains the same but the angle of incidence of the light changes. Light having a wavelength $\lambda_K$ corresponding to the wavelength having changed passes through the interference filter 32A.

The corrector 436 then corrects the spectral image captured when the dimension of the gap G is $g_0$ to a spectral image at the wavelength $\lambda_K$ instead of the target wavelength $\lambda_0$. That is, the wavelength of the light to be received at each pixel of the spectral image is corrected based on the angle of inclination. In particular, the analysis processor 434, before performing the analysis, calculates the optical spectrum at each pixel based on a plurality of spectral images. In this process, the target wavelength for each of the spectral images is corrected based on the angle of inclination, as described above, for accurate calculation of the optical spectrum at each pixel.

The dimension of the gap G for transmission of light having a target wavelength may instead be corrected. That is, when the dimension of the gap G is set at $g_1$, light having the wavelength corresponding to dimension $g_1 \times \cos\theta$ passes. The corrector 436 may therefore correct data in the drive table in such a way that the wavelength corresponding to dimension $g_1 \times \cos\theta$ is the target wavelength.

Effects Provided by Action in Present Embodiment

In the spectroscopic camera 1A according to the present embodiment, the three recesses 331 are provided as the markers 33 in the mirror facing area A1 of the interference filter 32A.

As a result, not only misalignment of the interference filter 32A in the plane XY but misalignment of the interference filter 32A due to inclination thereof with respect to the plane XY can be detected.

In the spectroscopic camera 1A according to the present embodiment, the spectroscopic measurement section 43 includes the angle calculator 435, which calculates the angle of inclination of the interference filter 32A with respect to the optical axis O of the imaging device 20 based on the marker pixels contained in a spectral image captured with the imaging device 20, and the corrector 436, which corrects the wavelength of the light received at each pixel of the imaging device 20 based on the calculated angle of inclination.

An accurate optical spectrum can thus be measured at each pixel of the spectral image.

Third Embodiment

A third embodiment will next be described.

In the first and second embodiments described above, providing the interference filters 32 and 32A with the markers 33 allows accurate detection of the positions of the interference filters 32 and 32A with respect to the imaging device 20, whereby the interference filters 32 and 32A can each be positioned in a proper position.

In contrast, the third embodiment differs from the embodiments described above in that an interference filter position adjustment mechanism is further provided.

Figure 7:
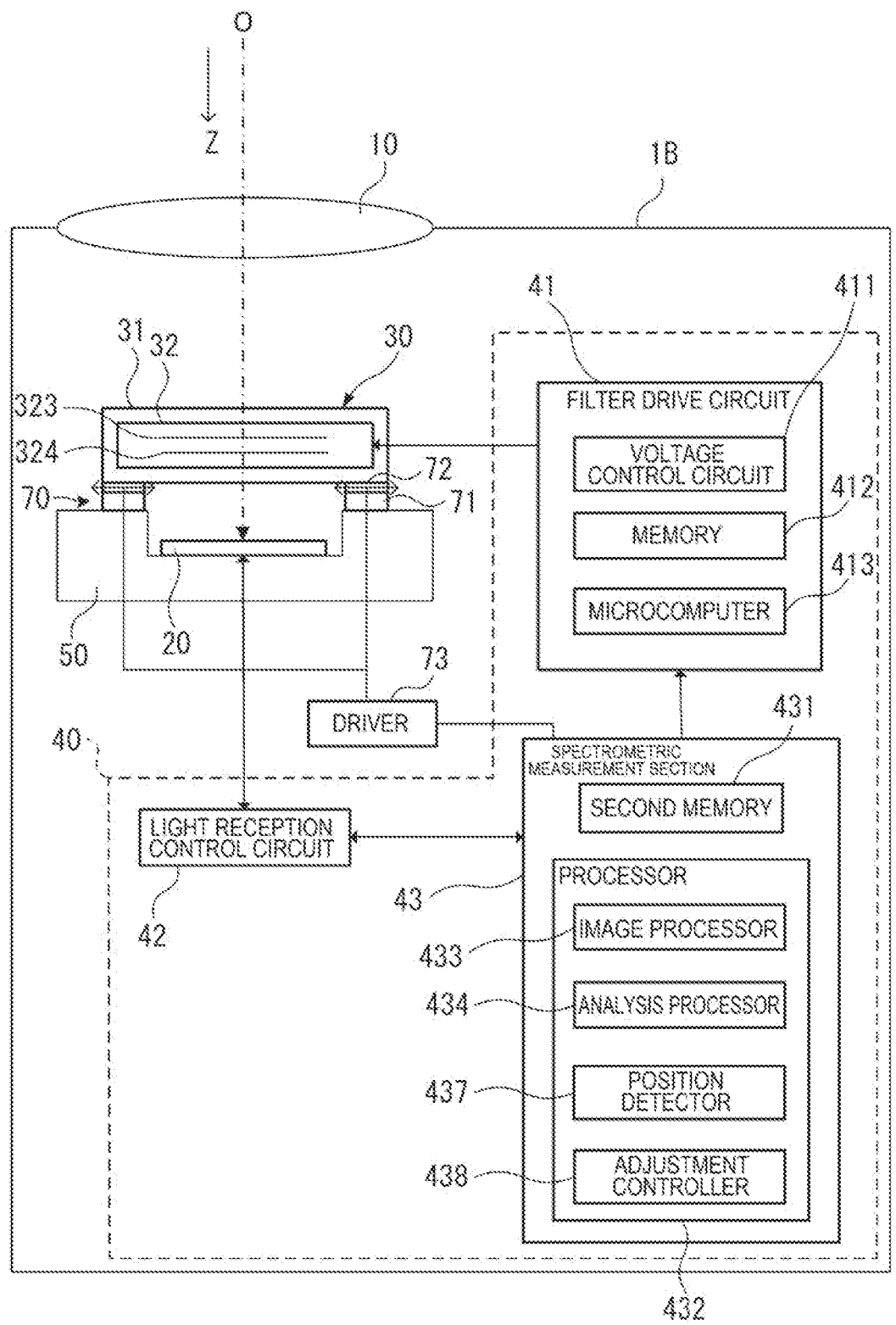
FIG. 7 shows a schematic configuration of a spectroscopic camera according to a third embodiment.

FIG. 7 shows a schematic configuration of a spectroscopic camera 1B according to the present embodiment.

In the spectroscopic camera 1B according to the present embodiment, the optical module 30 is attached to the mount section 50 via a movement mechanism 70, as shown in FIG. 7.

The movement mechanism 70 includes a seat 71, which is fixed, for example, to the mount section 50, a stage 72, which holds the optical module 30, and a driver 73, which moves the stage 72 relative to the seat 71. More specifically, the driver 73 includes, although not shown, an X mover, a Y mover, and a rotator. The X mover moves the stage 72 along the axis X, which is perpendicular to the optical axis O. The Y mover moves the stage 72 along the axis Y, which is perpendicular to the optical axis O and the axis X. The rotator rotates the stage 72 around a predetermined axis of rotation parallel to the optical axis O. When three or more markers 33 are provided, as in the second embodiment, a tilt mechanism that changes the angle of inclination of the interference filter 32 with respect to the light receiving surface of the imaging device 20 may be provided.

The spectroscopic measurement section 43 in the present embodiment includes a position detector 437 and an adjustment controller 438, as shown in FIG. 7.

The position detector 437 calculates the position and attitude of the interference filter 32 based on the marker pixels contained in a spectral image captured with the imaging device 20. In the present embodiment, reference marker coordinates where the marker pixels should be intrinsically located in a spectral image are recorded in the second memory 431. The position detector 437 calculates the amount of movement of the stage 72 based on the difference between the coordinates of the marker pixels detected based on the spectral image and the reference marker coordinates.

For example, the interference filter 32 in the first embodiment is provided with two markers 33. The amount of movement of the interference filter 32 in the directions X and Y can therefore be calculated based on the coordinates of the marker pixels corresponding to the two markers 33 and the reference marker coordinates. Further, the amount of rotation of the interference filter 32 can be calculated based on the angle between the straight line that connects the two marker pixels and the straight line that connects the reference marker coordinates. When three markers 33 are provided, for example, in the second embodiment, the angle of inclination of the interference filter 32A with respect to the optical axis O can be calculated.

The adjustment controller 438 moves the interference filter 32 based on the amount of movement calculated by the position detector 437 to adjust the position of the interference filter 32 with respect to the imaging device 20.

That is, the adjustment controller 438 drives the X mover based on the amount of movement in the direction X, drives the Y mover based on the amount of movement in the direction Y, and drives the rotator based on the amount of rotation. When three markers 33 are provided, for example, in the interference filter 32A in the second embodiment, the tilt mechanism may be controlled based on the calculated angle of inclination with respect to the optical axis O.

Effects Provided by Action in Present Embodiment

In the present embodiment, the spectroscopic camera 1B includes the movement mechanism 70, which moves the position of the interference filter 32 relative to the imaging device 20, and the adjustment controller 438, which controls the movement mechanism 70 to adjust the positions of the interference filter 32 and the imaging device 20 based on the marker pixels contained in a spectral image captured with the imaging device 20.

In this case, the adjustment controller 438 can control the movement mechanism 70 to properly adjust the position of the interference filter 32 with respect to the imaging device 20 as long as the optical module 30 is placed in a position where the marker pixels are contained in a captured spectral image. Therefore, when the spectroscopic camera 1B is assembled, the interference filter 32 does not need to be precisely positioned with respect to the imaging device 20, whereby the efficiency at which the spectroscopic camera 1B is manufactured can be improved.

Further, even when the position of the interference filter 32 is shifted with respect to the imaging device 20 due, for example, to external impact at the time of use of the spectroscopic camera 1B, the position detector 437 can detect the shift of the position of the interference filter 32. The adjustment controller 438 can therefore control the movement mechanism 70 to correct the shift of the position of the interference filter 32.

Fourth Embodiment

A fourth embodiment will next be described.

In the first and second embodiments described above, the case where the recesses 331 provided in the first reflection film 323 have been presented as the markers 33 by way of example.

In contrast, the fourth embodiment differs from the embodiments described above in that the markers 33 are each formed of a light blocker.

Figure 8:
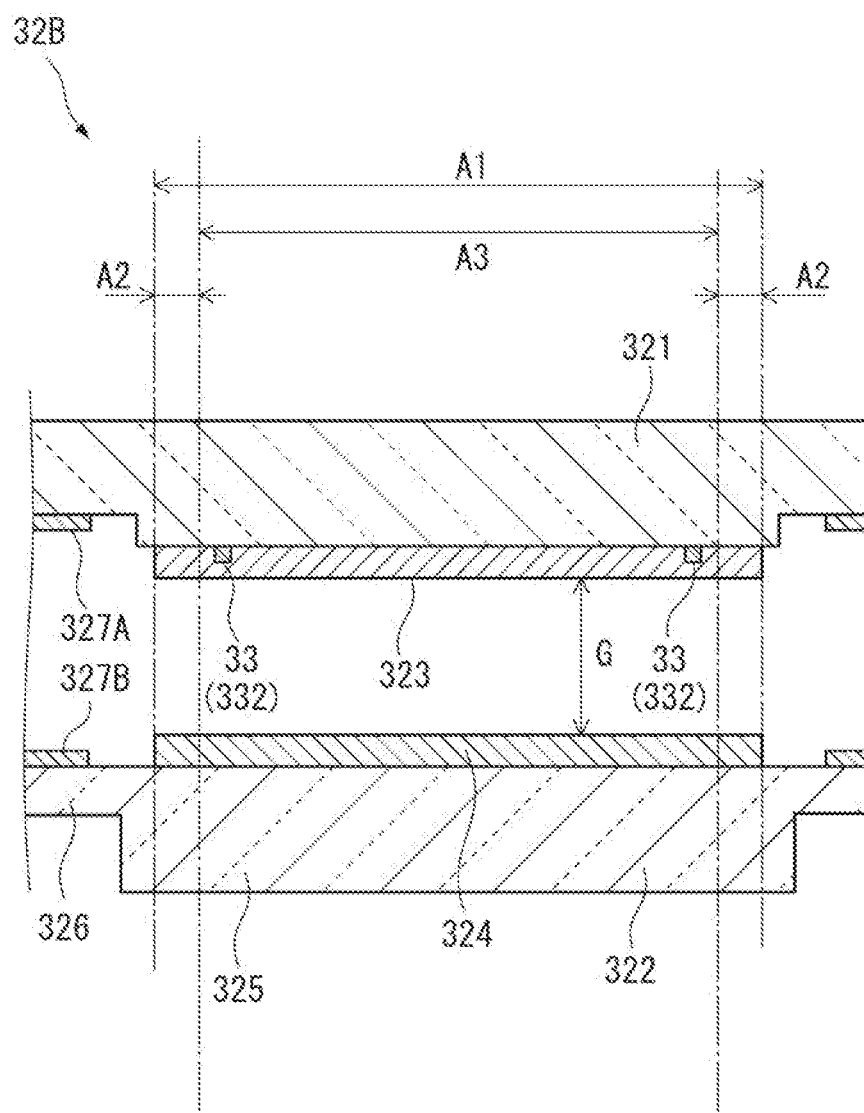
FIG. 8 shows an example of the markers provided in an interference filter in a fourth embodiment.

FIG. 8 shows an example of the markers 33 provided in an interference filter 32B in the present embodiment.

In the interference filter 32B in the present embodiment, light blockers 332 are provided as the markers 33 in the mirror facing area A1. The light blockers 332 are made of the same electrode material as that of the first electrode 327A and formed concurrently with the formation of the first electrode 327A on the first substrate 321. That is, the first electrode 327A is formed by depositing the electrode material of the first electrode 327A on a surface of the first substrate 321 that is the surface facing the second substrate 322 and then etching or otherwise patterning the electrode material. In this process, the electrode material is left in part of the mirror facing area A1 to form the light blockers 332.

In the present embodiment, when the optical module 30 is fixed to the base section 50 with the interference filter 32B and the imaging device 20 aligned with each other, light containing the light having the predetermined first wavelength is caused to be enter the interference filter 32B. In this process, the gap G in the interference filter 32B is adjusted to a dimension that allows the light having the first wavelength to pass through the interference filter 32B. The dimension of the gap G that corresponds to the first wavelength can, for example, be the initial gap dimension of the gap G.

As a result, in the present embodiment, the amount of light at each of the marker pixels is significantly smaller than that at the other pixels in a spectral image captured with the imaging device 20, whereby the positions of the markers 33 can be identified.

Effects Provided by Action in Present Embodiment

In the spectroscopic camera according to the present embodiment, the markers 33 are the light blockers 332, which block part of the light incident on the mirror facing area A1.

In this case, in a spectral image captured with the imaging device 20, the pixels corresponding to the positions where the light blockers 332 block the light can be detected as the marker pixels. The thus detected positions of the marker pixels allow detection of the position of the interference filter 32B with respect to the imaging device 20, whereby the adjustment of the position of the interference filter 32B can be preferably performed.

Further, in the present embodiment, the light blockers 332 are made of the same material as that of the first electrode 327A, which forms the electrostatic actuator 327. The thus configured light blockers 332 can be formed in the process of forming the first electrode 327A on the first substrate 321 by depositing an electrode material on the first substrate 321 and removing the electrode material in the area excluding the first electrode 327A and the light blockers 332, for example, in an etching process. That is, the first electrode 327A and the light blockers 332 can be formed at the same time, whereby the manufacturing efficiency can be improved.

Fifth Embodiment

A fifth embodiment will next be described.

In the first to fourth embodiments described above, the case where the markers 33 are so provided as to face the effective pixel area 20A, where the imaging device 20 captures a spectral image, has been presented by way of example. In contrast, the present embodiment differs from the embodiments described above in that the markers 33 are provided in the recording area 20B.

Figure 9:
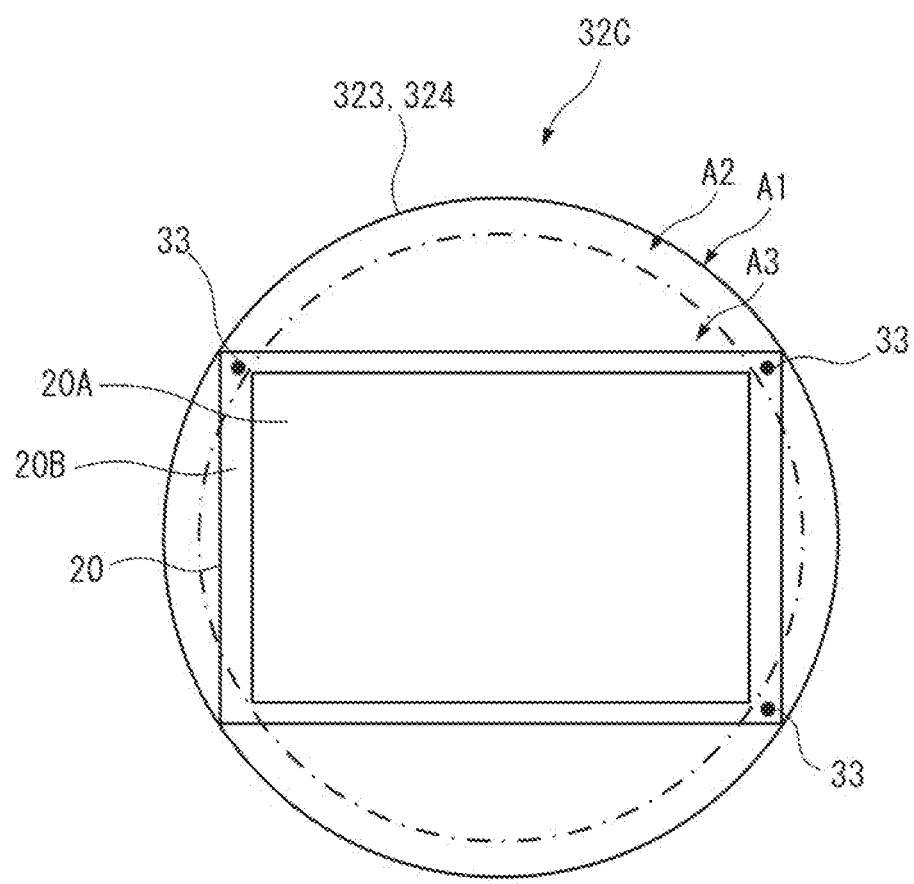
FIG. 9 shows another example of the positional relationship among the mirror facing area, the markers, and the imaging device in an interference filter in a fifth embodiment.

FIG. 9 shows the positional relationship among the mirror facing area A1, the markers 33, and the imaging device 20 in an interference filter 32C in the fifth embodiment.

In the present embodiment, the markers 33 in the interference filter 32C are so provided that the marker pixels are located in predetermined positions in the recording area 20B when the interference filter 32C is positioned in a proper position with respect to the imaging device 20.

The imaging device 20 also outputs light reception signals that do not contribute to the generation of a spectral image to be outputted from the recording area 20B as well as the light reception signals used to generate a spectral image to be outputted from the pixels in the effective pixel area 20A. In the present embodiment, the marker pixels are detected based on the light reception signals outputted from the pixels in the recording area 20B instead of the spectral image outputted from the effective pixel area 20A of the imaging device 20. The interference filter 32C can thus be so positioned that the marker pixels are located in the predetermined positions in the recording area 20B.

Further in the present embodiment, a spectral image captured with the imaging device 20 does not contain the marker pixels. Therefore, the image processor 433 does not need to correct the grayscale values at the marker pixels, and the analysis processor 434 does not also need to exclude the marker pixels.

Another Example of Fifth Embodiment

Figure 10:
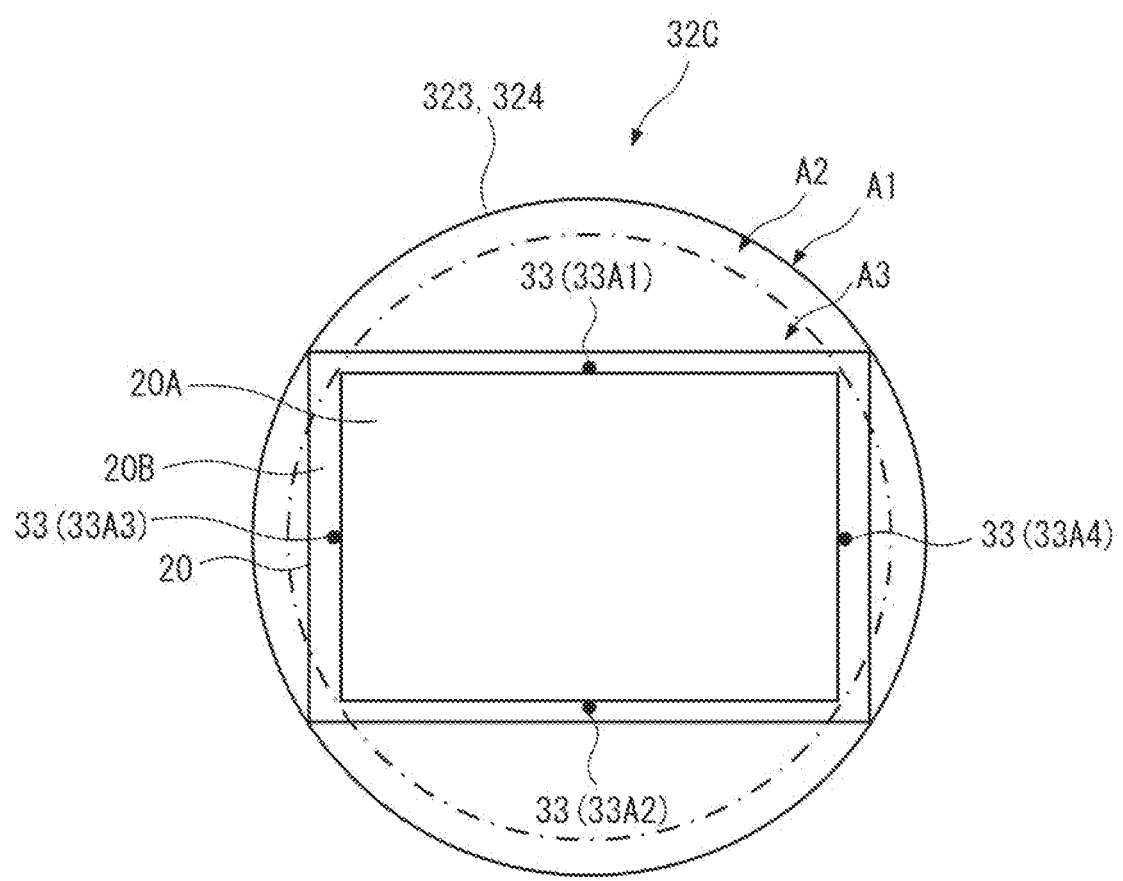
FIG. 10 shows the positional relationship among the mirror facing area, the markers, and the imaging device in an interference filter in another example of the fifth embodiment.

FIG. 10 shows the positional relationship among the mirror facing area A1, the markers 33, and the imaging device 20 in the interference filter 32C in another example of the fifth embodiment.

In the example shown in FIG. 9, the interference filter 32C is so positioned that the marker pixels are located in the recording area 20B in positions separate by a predetermined distance from the effective pixel area 20A. The markers 33 may instead be provided in the recording area 20B at the pixels that are adjacent to the effective pixel area 20A and located in positions 33A1 and 33A2, which sandwich the effective pixel area 20A in the direction parallel to the short sides thereof, and positions 33A3 and 33A4, which sandwich the effective pixel area 20A in the direction parallel to the long sides thereof, as shown in FIG. 10.

In this case, the interference filter 32C may be so positioned with respect to the imaging device 20 that the marker pixels corresponding to the markers 33 are not contained in a spectral image captured via the effective pixel area 20A. That is, the detection of the marker pixels based on the light reception signals outputted from the recording area 20B may not performed.

Effects Provided by Action in Present Embodiment

In the present embodiment, when the interference filter 32C is positioned in the proper position with respect to the imaging device 20, the markers 33 are provided in positions facing the recording area 20B of the imaging device 20.

In the configuration described above, the marker pixels can be detected based on the light reception signals outputted from the recording area 20B, whereby the interference filter 32C can be appropriately positioned with respect to the imaging device 20, as in the embodiments described above.

The interference filter 32C may instead be so positioned that the marker pixels are not contained in a spectral image outputted from the effective pixel area 20A, as shown in FIG. 10. Also in this case, the interference filter 32C can be appropriately positioned with respect to the imaging device 20, as in the embodiments described above.

In the present embodiment, a spectral image captured with the imaging device 20 does not contain the marker pixels corresponding to the markers 33. Therefore, the image processor 433 does not need to correct the grayscale values at the marker pixels, and the analysis processor 434 does not need to perform the component analysis excluding the marker pixels, whereby the entire pixels of a spectral image can be used as measured values.

Variations

The present disclosure is not limited to the embodiments described above, and variations, improvements, and other modifications of the embodiments to the extent that the object of the present disclosure is achieved fall within the scope of the present disclosure.

Variation 1

In the first embodiment described above, the case where the effective pixel area 20A of the imaging device 20 is inside the mirror facing area A1 when viewed along the direction Z, but not necessarily.

The effective pixel area 20A may be larger than the mirror facing area A1. Also in this case, the imaging device 20 is hidden behind the optical module 30 at the time of positioning of the optical module 30 as long as the imaging device 20 is smaller than the optical module 30, resulting in degradation in precision of the positioning of the optical module 30.

In contrast, providing the interference filter 32 with the markers 33 and capturing a spectral image containing the marker pixels via the effective pixel area 20A allow precise positioning of the optical module 30 based on the marker pixels.

Variation 2

In the first embodiment, the case where the recesses 331, which pass through the first reflection film 323, are provided as the markers 33 has been presented by way of example, but not necessarily. For example, a groove having a groove bottom may be formed as each of the recesses 331 in the first reflection film 323. That is, in the mirror facing area A1, a portion having a thickness different from that of the other portion may function as each of the markers 33. In this case, in the mirror facing area A1, the optical characteristics of the recesses 331 corresponding to the markers 33 differ from those of the other portion. Therefore, the marker pixels corresponding to the markers 33 can be detected, for example, by changing the dimension of the gap G and capturing a plurality of spectral images.

Further, in the first embodiment, the case where the markers 33 are the recesses 331 has been presented by way of example. For example, the markers 33 may instead be formed by providing protrusions on the first reflection film 323. Also in this case, the optical characteristics of the positions where the protrusions are provided differ from those of the other portion in the mirror facing area A1, whereby the marker pixels can be readily detected from a spectral image.

In the fourth embodiment, the case where the light blockers 332 are made of the same electrode material as that of the first electrode 327A has been presented by way of example, but not necessarily. For example, the light blockers 332 may be made, for example, of black paint.

Further, the case where the light blockers 332 are provided between the first reflection film 323 and the first substrate 321 has been presented by way of example. The light blockers 332 may instead be provided on a surface of the first reflection film 323 that is the surface facing the second reflection film 324.

Further, the markers 33 only need to be provided in the mirror facing area A1 in the interference filter 32. For example, the markers 33 may be provided on a surface of the first substrate 321 that is the surfaces opposite the second substrate 322 or may be provided in the movable section 325.

Variation 3

The case where the markers 33 are each smaller than each pixel of the imaging device 20 has been presented by way of example, but not necessarily. For example, markers 33 each linearly extending in one direction may be provided. In this case, the interference filter 32 may be so positioned that a spectral image contains marker lines corresponding to the linear markers 33 and the marker lines coincide with the outer circumferential edge of the spectral image.

Variation 4

As the interference filter 32 provided in the optical module 30, a wavelength variable Fabry-Perot etalon element in which the electrostatic actuator 327 can change the dimension of the gap G between the first reflection film 323 and the second reflection film 324 has been presented by way of example. In contrast, a wavelength fixed Fabry-Perot etalon element having a fixed dimension of the gap G may be used as the interference filter 32.

What is claimed is:

1. A spectroscopic camera comprising:
an interference filter including a pair of reflection films; and
an imaging device that captures image light passing through the pair of reflection films,
wherein the interference filter is provided with a marker that changes a characteristic in accordance with which the image light passes, and the marker is provided in a position where the marker overlaps with an optical path of the image light that passes through the pair of reflection films.

2. The spectroscopic camera according to claim 1, wherein the marker provided in the interference filter is formed of two or more markers located at respective locations.

3. The spectroscopic camera according to claim 1, wherein the marker provided in the interference filter is formed of three or more markers located at respective locations.

4. The spectroscopic camera according to claim 3, further comprising:
an angle calculator that calculates an angle of inclination of the interference filter with respect to an optical axis of the imaging device based on the position of the marker contained in a captured image captured with the imaging device, and
a corrector that corrects a wavelength of light received at each pixel of the imaging device based on the angle of inclination.

5. The spectroscopic camera according to claim 1, wherein the marker is a recess provided in any of the reflection films.

6. The spectroscopic camera according to claim 1, wherein the marker is a light blocker that blocks part of the optical path.

7. The spectroscopic camera according to claim 6,
wherein the interference filter includes electrodes that form an electrostatic actuator that changes a dimension between the pair of reflection films, and
the light blocker is made of the same material as a material of the electrodes.

8. The spectroscopic camera according to claim 1,
wherein the imaging device has a plurality of pixels, and the marker is smaller than each of the pixels.

9. The spectroscopic camera according to claim 1,
wherein the imaging device has an effective pixel area that forms a captured image based on the received light and a recording area provided in an area outside the effective pixel area, and
the marker is provided in a position facing the effective pixel area.

10. The spectroscopic camera according to claim 9, further comprising
an image processor that performs image processing on the captured image,
wherein the image processor calculates a grayscale value at a marker pixel corresponding to the position of the marker contained in the captured image based on the grayscale values at pixels around the marker pixel.

11. The spectroscopic camera according to claim 9, further comprising
an analysis processor that analyzes a target object based on the captured image,
wherein the analysis processor excludes a marker pixel corresponding to the position of the marker contained in the captured image from a target under the analysis.

12. The spectroscopic camera according to claim 1,
wherein the imaging device has an effective pixel area where image data based on the received light is formed and a recording area provided in an area outside the effective pixel area, and
the marker is provided in a position facing the recording area.

13. The spectroscopic camera according to claim 1, further comprising:
a movement mechanism that moves a position of the interference filter relative to the imaging device; and
an adjustment controller that controls the movement mechanism based on the position of the marker with respect to the imaging device to adjust the positions of the interference filter and the imaging device.

* * * * *